United States Patent [19]

Rondano

[11] Patent Number: 5,310,481

[45] Date of Patent: May 10, 1994

[54] APPARATUS FOR CONTINUOUSLY SEPARATING A MIXTURE OF FLUIDS HAVING DIFFERENT DENSITIES

[76] Inventor: Alfred Rondano, 70 Barton St., Torrington, Conn. 06790

[21] Appl. No.: 771,340

[22] Filed: Oct. 4, 1991

[51] Int. Cl.⁵ .......................................... B01D 17/12
[52] U.S. Cl. .................................... 210/86; 210/104; 210/110; 210/121; 210/134; 210/220; 210/299; 210/522
[58] Field of Search .............. 210/121, 521, 522, 540, 210/802, DIG. 5, 109, 110, 207, 86, 104, 744, 134, 123, 220, 299; 166/267

[56] References Cited

U.S. PATENT DOCUMENTS

| | | | |
|---|---|---|---|
| 499,059 | 6/1893 | Traver | 210/121 |
| 1,069,169 | 8/1913 | Parker | 210/243 |
| 1,199,266 | 9/1916 | De V. Grant | 210/519 |
| 1,237,068 | 8/1917 | Loeb | 210/538 |
| 1,462,048 | 7/1923 | Richards | 210/259 |
| 1,985,591 | 12/1934 | Welsh | 210/703 |
| 2,242,139 | 5/1941 | Munroe | 210/540 |
| 2,288,989 | 7/1942 | Boosey | 210/538 |
| 2,393,498 | 1/1946 | Miller | 210/538 |
| 2,782,929 | 2/1957 | Colket | 210/540 |
| 3,478,874 | 11/1969 | McLean et al. | 210/703 |
| 3,499,266 | 3/1970 | Talley | 55/169 |
| 3,510,001 | 5/1970 | Baer et al. | 210/705 |
| 3,529,728 | 9/1970 | Middelbeek et al. | 210/522 |
| 3,743,598 | 7/1973 | Field | 210/738 |
| 3,769,207 | 10/1973 | Baer | 210/703 |
| 3,945,918 | 3/1976 | Kirk | 210/703 |
| 3,971,719 | 7/1976 | Peters | 210/540 |
| 4,042,512 | 8/1977 | McCarthy et al. | 210/521 |
| 4,053,414 | 10/1977 | in'tVeld | 210/117 |
| 4,064,054 | 12/1977 | Anderson et al. | 210/522 |
| 4,123,365 | 10/1978 | Middelbeek | 210/521 |
| 4,159,036 | 6/1979 | Wilson et al. | 166/267 |
| 4,208,291 | 6/1980 | Ochoa | 210/522 |
| 4,216,085 | 8/1980 | Chittenden | 210/703 |
| 4,247,312 | 1/1981 | Thakur et al. | 210/522 |
| 4,255,262 | 3/1981 | O'Cheskey et al. | 210/703 |
| 4,308,136 | 12/1981 | Warne, Jr. | 210/540 |
| 4,422,931 | 12/1983 | Wolde-Michael | 210/540 |
| 4,477,344 | 10/1984 | Olszewski et al. | 210/522 |
| 4,515,698 | 5/1985 | Stewart | 210/802 |
| 4,527,633 | 7/1985 | McLaughlin et al. | 166/370 |
| 4,534,862 | 8/1985 | Zlokarnik | 210/221.2 |
| 4,555,345 | 11/1985 | Yoshida | 210/705 |
| 4,564,457 | 1/1986 | Cairo, Jr. et al. | 210/704 |
| 4,594,155 | 6/1986 | Conway | 210/522 |
| 4,618,430 | 10/1986 | Favret, Jr. et al. | 210/703 |
| 4,625,801 | 12/1986 | McLaughlin et al. | 166/267 |
| 4,653,960 | 3/1987 | Chun | 405/210 |
| 4,678,040 | 7/1987 | McLaughlin et al. | 166/370 |
| 4,722,800 | 2/1988 | Aymong | 210/521 |
| 4,800,025 | 1/1989 | Bibaeff | 210/703 |
| 4,824,579 | 4/1989 | George | 210/703 |
| 4,830,755 | 5/1989 | Hardin | 210/662 |
| 4,839,022 | 6/1989 | Skinner | 208/13 |
| 4,881,473 | 11/1989 | Skinner | 110/244 |
| 4,889,638 | 12/1989 | Rockford et al. | 210/703 |
| 4,940,539 | 7/1990 | Weber | 210/538 |
| 4,960,513 | 10/1990 | Young | 210/533 |

*Primary Examiner*—Joseph W. Drodge
*Attorney, Agent, or Firm*—McCormick, Paulding & Huber

[57] ABSTRACT

In a separator for separating a mixture of fluids of different densities into a high density fraction and a low density fraction, the mixture is introduced into a tank which is divided into a plurality of separation chambers and a collection chamber. As the mixture flows through the chambers it is separated into high and low density fractions with progressively more distinct differentials of density. The rate of fluid flow through the separator is controlled in part by the size of the separation chambers and by an automatic electro-mechanical control system. The control system includes several floats suspended within the fluids, wherein the level of at least one float is indicative of the level of high density fraction in the separator, and the level of at least one other float is indicative of the level of the low density fraction in the separator. The control system is responsive to the positions of the floats to control the fluid flow into the separator, and to control the discharge of high density fraction and low density fraction from the separator.

26 Claims, 2 Drawing Sheets

FIG. 2

APPARATUS FOR CONTINUOUSLY SEPARATING A MIXTURE OF FLUIDS HAVING DIFFERENT DENSITIES

BACKGROUND OF THE INVENTION

The present invention relates to an apparatus for continuously separating a mixture of fluids of different densities into a high density fraction and a low density fraction. More particularly, the present invention relates to an apparatus for ground water remediation, wherein the apparatus continuously separates gasoline, heating oil and other petroleum-based substances from ground water contaminated with such substances.

In recent years it has become painfully evident that a serious environmental threat is posed by ground water contaminated with petroleum products either draining through the soil from surface spills or leaking from underground storage tanks such as, for example, residential and commercial heating oil storage tanks and gasoline storage tanks installed at filling stations. Ground water contaminated from leaking gasoline storage tanks is a particularly acute problem since a large number of these tanks, which typically hold many tens of thousands of gallons of gasoline, were buried twenty or more years ago and have been leaking for substantial periods of time.

Where contaminated ground water is suspected, test wells are drilled to precisely determine the nature and extent of the contamination. Once this is accomplished, ground water is pumped from the wells to a device such as an air stripper or a carbon filter to remove the contamination. These devices are well known to those skilled in the art and will not be further described here except to say that such devices have not proven to be particularly effective at removing petroleum-based contaminants from ground water. Moreover, both types of equipment are easily clogged by such contaminants and quickly become packed with the sand, iron, manganese and other mineral particles often found suspended in ground water.

Accordingly, it is the object of the present invention to provide an apparatus for separating a mixture of fluids of different density into a high density fraction and a low density fraction.

It is a further object of the present invention to provide such an apparatus which is particularly suitable for removing petroleum-based contaminants from ground water.

It is a still further object of the present invention to provide an apparatus which operates continuously and automatically to remove petroleum-based contaminants from ground water without the need for frequent maintenance.

SUMMARY OF THE INVENTION

The present invention meets the above-stated objects by providing a separator for continuously separating a mixture of fluids having different densities into a high density fraction and a low density fraction. A separator according to the invention comprises a tank having a top, a bottom, an inlet end and a discharge end. The interior of the tank is divided by a plurality of partitions into a number of chambers including a first separation chamber at the inlet end of the tank, a second separation chamber adjacent the first separation chamber, a last separation chamber at the discharge end of the tank and a collection chamber at the discharge end of the tank. Each of the separation chambers has an upper portion for containing the low density fraction separated from the mixture of fluids and a lower portion for containing the high density fraction separated from the mixture. An important aspect of the invention is that the second separation chamber is substantially larger than the first separation chamber and the last separation chamber is substantially larger than the second separation chamber.

The separator further comprises a first fluid communication means for serially connecting the upper portions of the separation chambers and the collection chamber to define a first fluid flow path for the low density fraction separated from the mixture. Thus, the first fluid flow path extends from the inlet end of the tank to the collection chamber. Inlet means for introducing the mixture into the lower portion of the first separation chamber to at least partially fill the first chamber is also provided. Once the mixture has been introduced into the first separation chamber it begins to separate into a low density fraction contained in the upper portion of the first chamber and a high density fraction contained in the first chamber's lower portion. Fluid transfer means are provided for transferring at least a portion of the mixture introduced into the lower portion of the first separation chamber and the high density fraction contained therein to the lower portion of the second separation chamber to at least partially fill the second chamber.

The separator still further comprises a second fluid communication means which serially connects the lower portions of the separation chambers, excluding the lower portions of the first and second separation chambers. The second fluid communication means and the fluid transfer means cooperate to define a second fluid flow path for the high density fraction which extends from the inlet end of the tank to the lower portion of the last separation chamber at the discharge end of the tank. A first discharge means is provided for removing the high density fraction which collects in the lower portion of the last separation chamber, and a second discharge means for removing the low density fraction from the collection chamber is also provided.

Finally, the separator includes control means for controlling the flow rates and levels of the mixture and the low and high density fractions in the chambers so that the completely separated into a low density fraction and a high density fraction at the discharge end of the tank.

DETAILED DESCRIPTION OF THE INVENTION

Figure 1:
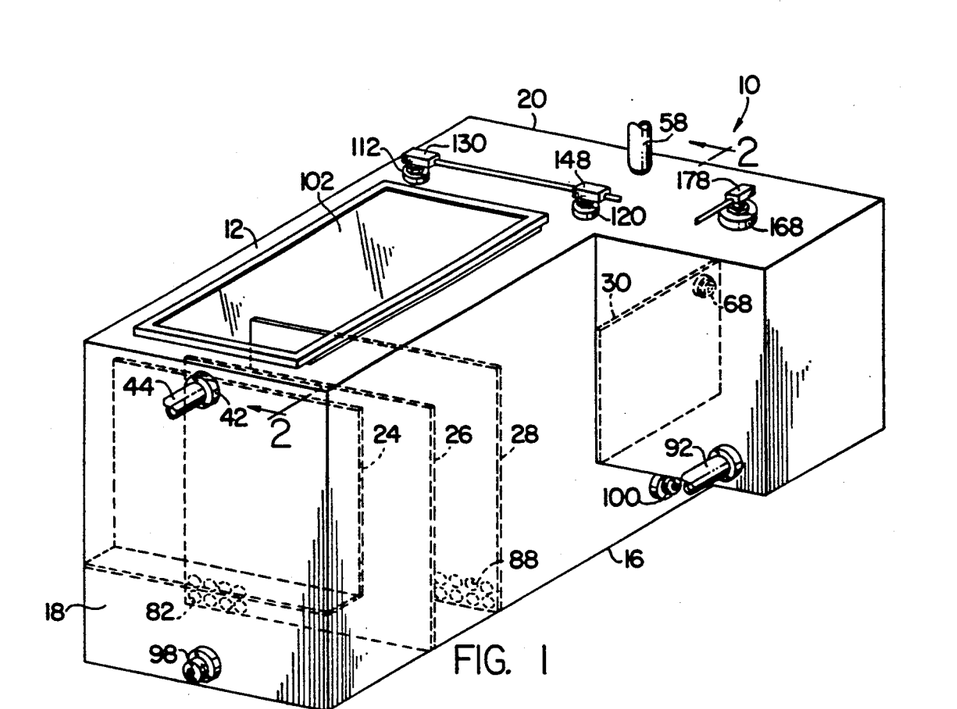
FIG. 1 is a perspective view of a separator according to the present invention.

FIG. 1 shows a separator made according to the invention. The separator 10 comprises a generally L-shaped tank 12 having a top 14, a bottom 16, an inlet end 18 and a discharge end 20. The interior 22 of the tank 12 is divided by a plurality of vertical partitions 24, 26, 28 and 30 into a first separation chamber 32, a second separation chamber 34, a third separation chamber 36, a last separation chamber 38 and a collection chamber 40. While the illustrated embodiment includes four separation chambers, it should be understood that the number of such chambers is not critical as long as first, second and last separation chambers are provided. Further, as will be explained in more detail below the separator is constructed so that the second separation chamber is substantially larger than the first separation chamber and the last separation chamber is substantially larger than the second chamber.

Figure 2:
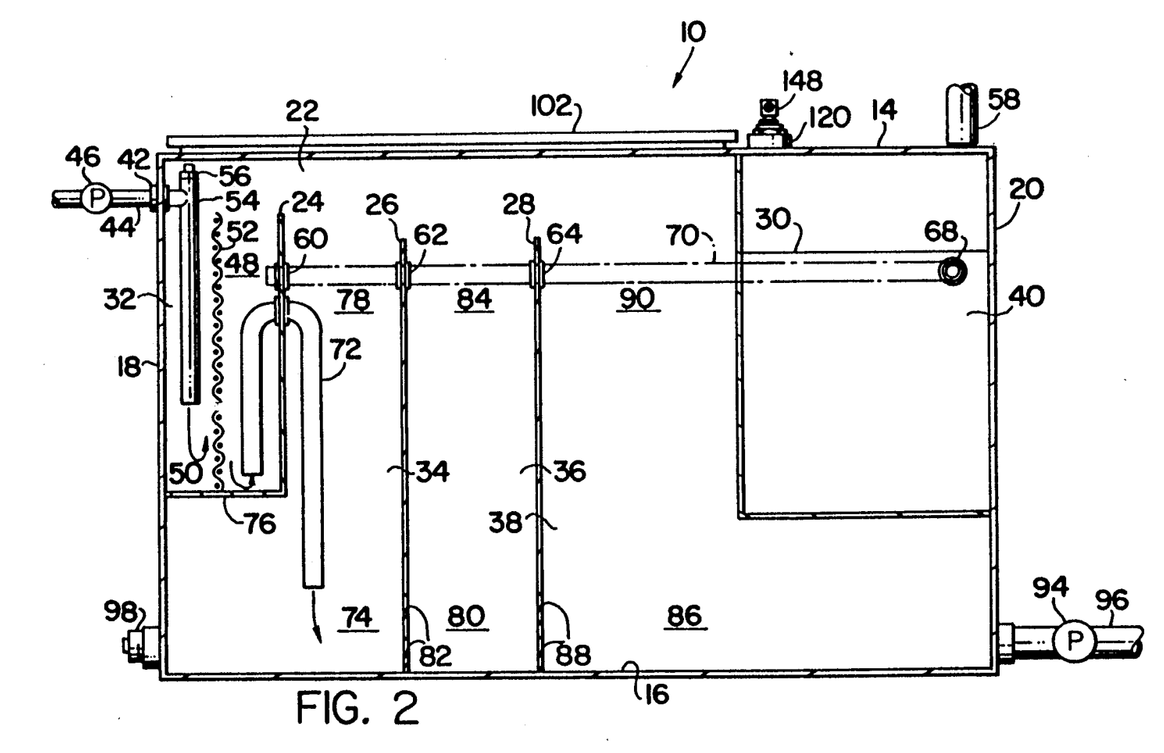
FIG. 2 is a sectional view taken along the 2—2 of FIG. 1.

Referring now to both FIGS. 1 and 2, an opening 42 is formed in the inlet end 18 of the tank. Entering the separator through the opening is an inlet pipe 44 which delivers a mixture of fluids of different densities to the separator 10. In the present case, the inlet pipe is connected to an influent pump 46 which pumps water contaminated with petroleum products from below ground level to the separator. As illustrated in FIG. 2, the inlet pipe enters the separator within the upper portion 48 of chamber 32 and extends downwardly at a 90° angle into the lower portion 50 of the chamber.

A good deal of turbulence is created in the incoming mixture by pumping it through the pipe 44 and into the lower portion of separation chamber 32. This turbulence causes the mixture to begin separating into a high density fraction, comprising water with suspended sand and mineral particles and some amount of petroleum contaminants, and a low density fraction comprising petroleum contaminates together with some amount of ground water. As the fluid level in chamber 32 rises, the fraction of higher density, together with the incoming mixture, is located generally within the lower portion 50 of chamber 32; the low density fraction separated from the mixture floats on top of the high density fraction and is located generally within the upper portion 48 of the chamber.

A vertical screen 52 is positioned in chamber 32 between the inlet pipe 44 and partition 24. The screen significantly enhances the separation of the mixture by providing both a turbulence creating surface and a coagulating surface on which particles of petroleum-based contaminants collect. The screen is a particularly effective coagulating surface because the particles of sand and minerals, such as iron and manganese, suspended in the mixture readily adsorb petroleum contaminants to form small globules which readily adhere to the screen.

As illustrated in FIG. 2, the inlet pipe includes a T-fitting 54 having an associated threaded plug 56. When the plug is removed and influent pump 46 is operating, air supplied through vent 58 in the top of the tank is drawn into the pipe by the vacuum created at the T-fitting by the flowing mixture. The introduction of air into the mixture causes additional turbulence which further increases the separation of the mixture within chamber 32. To further enhance separation within chamber 32, compressed air may be pumped into the inlet pipe from a compressor (not shown) located outside of the tank 12 and connected to the T-fitting with an air line (not shown).

Once the mixture begins entering chamber 32 and separating into high and low density fractions, a number of options for removing fluid from chamber 32 are provided based on the degree of separation in chamber 32 and the amount of contamination in the ground water. In cases where the mixture readily separates, the fluid level in chamber 32 is permitted to rise until it cascades over the top of partition 24 and into separation chamber 34. As illustrated in the Figures, near the top of each partition 24-30 an opening 60 is respectively formed therein. A conduit 70 (shown in phantom) is inserted through the openings 60 to connect the upper portion 48 of chamber 32 with the collection chamber 40. As separation chamber 32 fills and the low density fraction reaches the level of opening 60, a portion of the low density fraction is siphoned from chamber 32 directly into the collection chamber through the conduit.

Alternatively, where the mixture contains a substantial amount of contamination or separating the mixture into high and low density fractions is difficult, the fluid level in separation chamber 32 is kept below the level of opening 60 by transferring at least some of the mixture and the high density fraction from the lower portion 50 of chamber 32 through siphon tube 72 into the lower portion 74 of separation chamber 34 in response to the levels of the mixture and the low and high density fractions in the tank. As can be seen from FIGS. 1 and 2, and as stated above, chamber 34 is substantially larger than chamber 32, and the lower portion 74 of chamber 34 actually extends beneath the bottom 76 of chamber 32 to provide a relatively large area for fluid circulation. This large circulation area results in at least a 60% reduction in the flow velocity of the mixture and the high density fraction entering the lower portion of chamber 34 from the siphon tube 72.

The slow rate at which the mixture and the heavy fraction transferred from chamber 32 circulate around the lower portion of chamber 34 and the relatively slow rate at which chamber 34 fills, as compared with the fill rate for the much smaller chamber 32, result in very effective separation of the fluid in chamber 34. Thus, the difference in density between the high density fraction located generally in the lower portion 74 of chamber 34 and the low density fraction located generally in the upper portion 78 of chamber 34 is considerably more defined than the density difference for the fractions separated in chamber 32.

As separation continues in chamber 34 the high density fraction in the lower portion of chamber 34 is continually removed into the lower portion 80 of separation chamber 36 through perforations 82 formed near the bottom of partition 26. As fluid is continually transferred into chamber 34 from chamber 32 and chamber 34 fills, the low density fraction in the upper portion 78 of the chamber is allowed to cascade over the top of partition 26 and into separation chamber 36. Again, if a large amount of petroleum-based contamination has separated out of the mixture and the high density fraction in chamber 34, a portion of the low density fractions is siphoned directly into the collection chamber 40 through conduit 70 which, in this case, connects the opening 62 with the collection chamber. While the high and low density fractions transferred from chamber 34 reside in the chamber 36 additional separation takes place. Thus, the difference in density between the high density fraction in the lower portion 80 of chamber 36 and the low density fraction in the upper portion 84 of that chamber is even more pronounced than the density differential between the fractions in chamber 34.

As chamber 36 fills, the low density fraction in the upper portion 84 of the chamber is allowed to cascade over the top of partition 28 and into separation chamber 38. While it is not likely at this point in the separation process, if a large amount of petroleum-based contamination has separated out of the high density fraction in chamber 36, a portion of the low density fractions is siphoned directly into the collection chamber 40 through conduit 70 which, in this case, connects the opening 64 with the collection chamber.

The high density fraction in the lower portion of chamber 36 is removed to the lower portion 86 of separation chamber 38 through perforations 88 formed near the bottom of partition 28. As can be seen from FIG. 1, the perforations 88 are formed in partition 28 on the opposite side of the tank from that on which perforations 82 are formed in partition 24. Further, siphon tube 72 terminates within the lower portion of chamber 34 on the opposite side of the tank from that on which the perforations 82 are formed in partition 26. Accordingly, a tortuous flow path is created for circulation of the high density fraction through the tank which causes additional turbulence and more effective separation.

As FIGS. 1 and 2 illustrate, separation chamber 38 is substantially larger than the other separation chambers. The large volume of chamber 38 permits both a relatively long residence time for the high and low density fractions transferred from chamber 36 and a very slow circulation rate through the chamber. These factors result in substantial further separation and the density differential between the fractions is enhanced over that found even in chamber 36. In fact, by controlling the rate of fluid flow through the tank 12, the low density fraction in chamber 38 consists almost entirely of petroleum-based contamination, and the high density fraction in the lower portion of chamber 38 comprises ground water with only a very small amount of suspended sand and mineral particles and with only negligible amounts of petroleum contaminants.

Thus, the final phase of the separation is completed in chamber 38, and as the chamber fills, the low density fraction in the upper portion 90 of chamber 38 reaches the level of opening 68 and is transferred into the collection chamber 40. The level of the high density fraction in the lower portion 86 of separation chamber 38 is controlled so that the high density fraction does not enter the upper portion 90 of chamber 38. Accordingly, the collection chamber contains only the separated petroleum contaminants which can simply be removed from the chamber through the drain line 92 (shown in FIG. 1) and disposed of. The decontaminated ground water in the lower portion of chamber 38 is pumped out of the chamber by effluent pump 94 through drain line 96. Once removed from the tank 12, the ground water can, in most cases, simply be pumped into a municipal sewer system. In some instances, however, it may be desirable to further treat the ground water in, for example, a carbon filter device.

The tank 12 is further provided with threaded plugs 98, 100 which may be removed for the purpose of flushing the bottom of the tank with water to eliminate accumulated sand and mineral particles or other insoluble materials that have been separated from the ground water. Periodic flushing of the tank is necessary because such materials readily settle from the slowly circulating fluid in the lower portion of the separation chambers and would disrupt the efficient operation of the separator if left unattended. The tank is also provided with a removeable, clear plastic cover 102 which not only permits visual inspection of the interior of the tank while the separator is operating, but also provides additional access means for cleaning and maintaining the interior of the tank.

Figure 3:
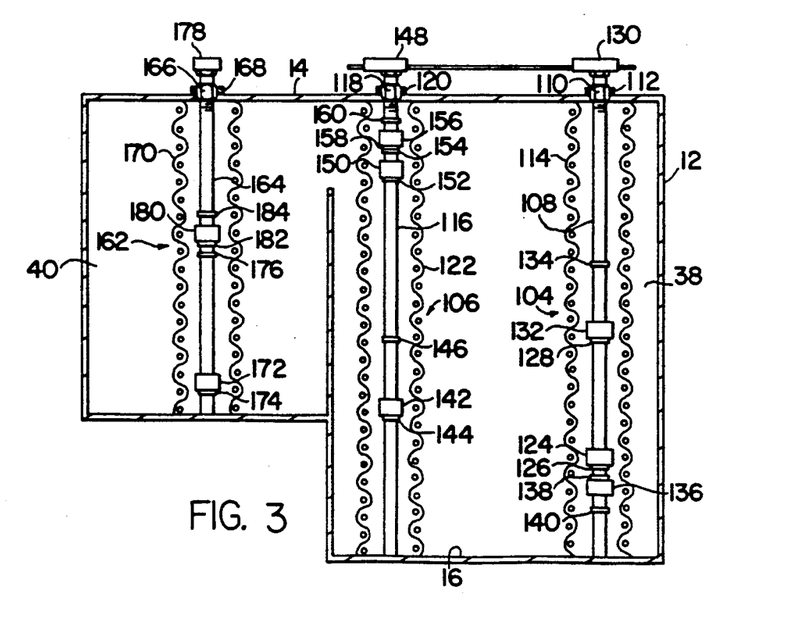
FIG. 3 is an end view of the separator of FIG. 1 partially broken away to illustrate the float assemblies which form a part of the separator.

Referring now to FIG. 3, the means for automatic operation of the separator will be described. Positioned within the last separation chamber 38 are two float assemblies 104 and 106. Float assembly 104 comprises a rod 108 threaded onto a bushing 110 received within a coupling 112 mounted on the top 14 of the tank 12. The rod 108 extends to the bottom 16 of the tank and is surrounded along its entire length by a protective screen 114. Similarly, float assembly 106 comprises a rod 116 threaded onto a bushing 118 received within a coupling 120 mounted on the top of the tank. The rod 116 also extends to the bottom of the tank and is surrounded by a protective screen 122.

Slidably mounted on the rod 108 is a float 124 which has a specific gravity just slightly below that of the high density fraction contained in the lower portion of chamber 38 but well above the specific gravity of the low density fraction in the chamber. Thus, float 124 floats on the surface of the high density fraction and is free to move up and down along rod 108 between effluent pump deactivation switch 126 and stop 128 as the level of the high density fraction rises and falls in chamber 38. Switch 126 is electrically connected through junction box 130 threaded into coupling 112 and a control panel to effluent pump 94. The manner of electrically connecting switch 126 and the effluent pump is well-known to those skilled in the art and will not be further described.

The location of switch 126 on rod 108 defines the lowest level to which the high density fraction in chamber 38 is permitted to fall under normal operating conditions. This ensures that none of the low density fraction, which as stated above comprises petroleum-based contaminants, is removed from the tank through the drain line 96. As effluent pump 94 removes decontaminated ground water from chamber 38 and the high density fraction falls to the level where float 124 contacts switch 126, effluent pump 94 is deactivated and the level of the high density fraction again begins to rise in the lower portion of chamber 38. Float 124 slides upwardly on rod 108 as the level of the high density fraction rises until float 124 engages stop 128.

At this point, float 132, which is slideably mounted on rod 108 and supported on stop 128 and which has the same specific gravity as float 124, begins to move upwardly on rod 108 buoyed by the rising level of the high density fraction. Float 132 continues to slide upwardly until in reaches effluent pump activation switch 134, which is located on rod 108 at a position that corresponds to the highest level to which the high density fraction is allowed to rise in chamber 38 under normal operation. Switch 134 is electrically connected through junction box 130 and the control panel (not shown) to the effluent pump 94, and when float 132 contacts switch 134 effluent pump 94 is activated to begin removing decontaminated ground water from chamber 38. As explained above, the effluent pump will continue to operate until the high density fraction in chamber 38 falls to the level at which float 124 once again contacts effluent pump deactivation switch 126.

As a safety measure, float assembly 104 further includes a third float 136 slidably mounted on rod 108. Float 136 has the same specific gravity as floats 124 and 132 and is free to move up and down on rod 108 between stop 138 and effluent pump off switch 140. As stated above, under normal operating conditions the level of the high density fraction never falls below the position of switch 126; thus, float 136 is normally located in its upward-most position on rod 108 in engagement with stop 138. However, if switch 126 should for some reason fail to deactivate effluent pump 94 when the falling level of the high density fraction brings float 124 into contact with switch 126, the high density fraction can continue to fall only to the point where float 136 contacts switch 140. Switch 140 is electrically connected to the effluent pump in the same manner that switch 126 is, and when float 136 contacts switch 140 the effluent pump is deactivated.

As stated previously, chamber 38 also includes float assembly 106. Assembly 106 comprises float 142 which is slidably mounted on rod 116 for movement between influent pump activation switch 144 and stop 146. Float 142 has a specific gravity slightly lower than that of the low density fraction contained in chamber 38 thus, float 142 floats on : the surface of the low density fraction in chamber 38 between switch 144 and stop 146 as the level of the low density fraction in chamber 38 rises and falls. As the effluent pump removes decontaminated ground water from chamber 38 under the control of float assembly 104 and the low density fraction falls to a level where float 142 contacts switch 144, switch 144, which is electrically connected to the influent pump through junction box 148 threaded into coupling 120 and the control panel, activates influent pump 46 to bring additional contaminated ground water into the tank for separation.

As an additional safety feature, float assembly 106 further includes float 150 which has a specific gravity equal to that of float 142. Thus, float 150 moves between stop 152 and influent pump deactivation switch 154 as the level of the separated petroleum-based contaminants rises and falls in chamber 38. Under normal operating conditions, the level of such contaminants would not be permitted to rise to the point where float 150 contacts switch 154. However, if for some reason effluent pump 94 does not operate to full capacity and influent pump 46 causes fluid to enter chamber 38 at a rate which raises the low density fraction in the chamber so that float 150 does contact switch 154, then the switch, which is connected to the influent pump via junction box 148 and the control panel, will deactivate the influent pump.

The electrical control circuit through which switch 154 deactivates the influent pump is adapted to function only if the effluent pump 94 operates to at least partial capacity. In the case where the effluent pump does not operate at all, float 156 ensures that the influent pump is deactivated before the fluid level in chamber 38 rises to a point where the high density fraction reaches opening 68 and spills into the collection chamber 40. Float 156, which has a specific gravity equal to that of floats 142 and 150, is slidably mounted on rod 116 for movement between stop 158 and influent pump deactivation switch 160. Thus, float 156 moves between stop 158 and influent pump deactivation switch 160 as the level of low density fraction rises and falls in chamber 38. Should the effluent pump fail to operate or should some other malfunction occur in the separator to cause the fluid level in chamber 38 to rise so that float 156 contacts switch 160, then the switch, which is connected to the influent pump through junction box 148 and the control panel, will deactivate the influent pump.

As illustrated in FIG. 3, the collection chamber 40 also houses a float assembly 162. Like the float assemblies in separation chamber 38, float assembly 162 comprises a rod 164 threaded onto a bushing 166 received within a coupling 168 mounted on the top 14 of the tank 12. The rod 164 extends to the bottom 16 of the tank and is surrounded along its entire length by a protective screen 170.

Slidably mounted on the rod 164 is a float 172 which has a specific gravity just slightly below that of the low density fraction contained in the collection chamber 40. Thus, float 172 floats on the surface of the low density fraction and is free to move up and down along rod 164 between stop 174 and separator deactivation switch 176 as the level of the low density fraction rises and falls in the collection chamber. Switch 176 is positioned in the collection chamber well below the opening 68 formed near the top of partition 30 and is electrically connected through junction box 178 threaded into coupling 168 and the control panel to both the influent and effluent pumps. Thus, under normal operating conditions the entire separator will shut down before the level of petroleum-based contaminants in the collection chamber can rise to a point where the contaminants flow back through opening 68 and into separation chamber 38.

As an added safety measure, float assembly 162 further includes float 180 which has a specific gravity equal to that of float 172. Thus, float 180 is free to move up and down on rod 164 between stop 182 and separator deactivation switch 184. As stated previously, under normal operating conditions the level of the separated petroleum-based contaminants in collection chamber 40 is not permitted to rise above the position of switch 176; thus, float 180 is normally located in its lowest position on rod 108 in engagement with stop 182. However, if switch 176 should for some reason fail to deactivate the influent and effluent pumps when the rising level of the low density fraction brings float 172 into contact with switch 176, the fluid level can rise in the collection chamber only to the point where float 180 contacts switch 184. Switch 180 is electrically connected to the pumps in the same manner that switch 176 is, and when float 180 contacts switch 184 the influent and effluent pumps are deactivated.

While a preferred embodiment of the invention has been shown and described, various substitutions and modifications may be made without departing from the spirit and scope of the invention. For example, the tank could include more than the four separation chambers illustrated. Alternatively, the separator could function with only three separation chambers. Moreover, the float assemblies do not necessarily require the redundant safety features set forth in the preferred embodiment. Accordingly, it is to be understood that the present invention has been described by way of example and not by limitation. In particular, while the present invention has been described in terms of the separation of petroleum-based contaminants from ground water, the separator would work equally well with any mixture comprising fluids of different densities.

I claim:

1. A separator adapted for continuously separating a mixture of fluids having different densities into a high density fraction and a low density fraction, said separator comprising:
   a tank having a top, a bottom, an inlet end and a discharge end;
   a plurality of partitions dividing the interior of the tank into a plurality of chambers including a first separation chamber at the inlet end of the tank, a second separation chamber adjacent the first separation chamber, a last separation chamber at the discharge end of the tank and a collection chamber at the discharge end of the tank, wherein each of said separation chambers has an upper portion for containing said low density fraction and a lower portion for containing said high density fraction and wherein said second separation chamber is substantially larger than said first separation chamber, and said last separation chamber is substantially larger than said second separation chamber;

first fluid communication means for serially connecting the upper portions of said first, second and last separation chambers and said collection chamber to define a first fluid flow path for said low density fraction, said first flow path extending from the inlet end of the tank to the collection chamber;

inlet means for introducing the mixture of fluids of different densities into the tank and the lower portion of the first separation chamber to at least partially fill the first chamber, wherein said mixture begins to separate into a low density fraction contained in the upper portion of the first chamber and a high density fraction contained in the lower portion of the first chamber;

fluid transfer means for transferring at least a portion of the mixture and the high density fraction contained in the lower portion of the first separation chamber to the bottom portion of the second separation chamber to at least partially fill the second chamber;

second fluid communication means for serially connecting the lower portions of the separation chambers excluding the lower portions of said first and second separation chambers, said second fluid communication means and said fluid transfer means cooperating to define a second fluid flow path for the high density fraction, said second flow path extending from the inlet end of the tank to the lower portion of the last separation chamber at the discharge end of the tank;

first discharge means for removing the high density fraction from the lower portion of the last separation chamber;

second discharge means for removing the low density fraction from the collection chamber; and control means for controlling the flow rates and levels of the mixture and the low and high density fractions in the chambers so that the mixture introduced into the first separation chamber is separated into a low density fraction and a high density fraction at the discharge end of the tank, including at least one first float member suspended in the high density fraction and in a portion of the tank exclusive of the inlet means and the first and second separation chambers and defined by a specific gravity less than the specific gravity of the high density fraction, at least one first activation member coupled to said first discharge means for controlling operation of said first discharge means in response to movement of said at least one first float member, at least one second float member suspended in the low density fraction and in a portion of the tank exclusive of the inlet means and the first and second separation chambers and defined by a specific gravity less than the specific gravity of the low density fraction, and at least one second activation member coupled to said inlet means for controlling operation of said inlet means in response to movement of said at least one second float member.

2. The separator of claim 1 wherein the bottom of the first separation chamber is at a level between the top and the bottom of the tank higher than the level of the bottom of the second separation chamber, and wherein the means for transferring comprises a siphon tube extending from a level near the bottom of the first chamber through the partition dividing the first separation chamber from the second separation chamber to a level near the bottom of the second separation chamber to siphon at least a portion of the mixture and the heavy fraction located in the lower portion of the first separation chamber to the lower portion of the second separation chamber in response to the levels of the mixture and the low and high density fractions in the tank.

3. The separator of claim 1 wherein the first discharge means comprises a drain line exiting the lower portion of the last separation chamber, and an effluent pump connected to the drain line for removing the heavy fraction from the lower portion of the last separation chamber in response to movement of said at least one first float member.

4. The separator of claim 1 wherein the inlet means comprises an inlet line entering the upper portion of the first separation chamber and terminating within the lower portion of the first separation chamber, and an influent pump connected to the inlet line for delivering a mixture of liquids of different densities to the lower portion of the first separation chamber in response to movement of said at least one second float member.

5. The separator of claim 1 further comprising means for injecting air into the mixture of liquids introduced into the lower portion of the first separation chamber.

6. The separator of claim 1 further comprising a screen positioned in the first separation chamber between the inlet means and the first partition, said screen providing a de-emulsifying surface which assists in separating the mixture into the low and high density fractions.

7. A separator as defined in claim 1, wherein said at least one first float member and said at least one second float member are located within the last separation chamber.

8. A separator as defined in claim 7, wherein said at least one first activation member controls said discharge means to discharge the low density fraction in said last separation chamber in response to said at least one first float member rising to a first predetermined level and to stop discharging the low density fraction in response to said at least one first float member dropping to a second predetermined level, and said at least one second activation member controls said inlet means to introduce fluids into said first separation chamber in response to said at least one second float member dropping to a first predetermined level and to stop introducing fluids into said first separation chamber in response to said at least one second float member rising to a first predetermined level.

9. A separator adapted for continuously separating a mixture of fluids having different densities into a high density fraction and a low density fraction, said separator comprising:

a tank having a top, a bottom, an inlet end and a discharge end;

a plurality of partitions dividing the interior of the tank into a plurality of chambers including a first separation chamber at the inlet end of the tank, a second separation chamber adjacent the first separation chamber, a last separation chamber at the discharge end of the tank, and a collection chamber at the discharge end of the tank, wherein each of said separation chambers has an upper portion for containing said low density fraction and a lower portion for containing said high density fraction, and wherein said second separation chamber is substantially larger than said first separation chamber, and said last separation chamber is substantially larger than said second separation chamber;

first fluid communication means for serially connecting the upper portions of said first, second and last separation chambers and said collection chamber to define a first fluid flow path for said low density fraction, said first flow path extending from the inlet end of the tank to the collection chamber;

inlet means for introducing the mixture of fluids of different densities into the lower portion of the first separation chamber to at least partially fill the first chamber, wherein said mixture begins to separate into a low density fraction contained in the upper portion of the first chamber and a high density fraction contained in the lower portion of the first chamber, said inlet means including an inlet line entering the first separation chamber and terminating within the lower portion of the first separation chamber, and an influent pump connected to the inlet line for delivering the mixture of fluids to the lower portion of the first separation chamber;

fluid transfer means for transferring at least a portion of the mixture and the high density fraction contained in the lower portion of the first separation chamber to the bottom portion of the second separation chamber to at least partially fill the second chamber;

second fluid communication means for serially connecting the lower portions of the separation chambers excluding the lower portions of said first and second separation chambers, said second fluid communication means and said fluid transfer means cooperating to define a second fluid flow path for the high density fraction, said second flow path extending from the inlet end of the tank to the lower portion of the last separation chamber at the discharge end of the tank;

first discharge means for removing the high density fraction from the lower portion of the last separation chamber, including a drain line exiting the lower portion of the last separation chamber, and an effluent pump connect to the drain line for removing the heavy fraction from the lower portion of the last separation chamber;

second discharge means for removing the low density fraction from the collection chamber; and control means for controlling the flow rates and levels of the mixture and the low and high density fractions in the chambers so that the mixture introduced into the first separation chamber is separated into a low density fraction and a high density fraction at the discharge end of the tank, including a first float assembly positioned in the last separation chamber, said first float assembly including:

a. a first float, said first float having a specific gravity lower than that of the high density fraction contained in the lower portion of the last separation chamber and higher than that of the low density fraction contained in the upper portion of the last separation chamber, said first float having associated first activation means, wherein the first float activates the effluent pump when the high density fraction rises to a first predetermined level in the last separation chamber, and b. a second float, said second float having a specific gravity substantially the same as that of the first float and having associated first deactivation means wherein the second float deactivates the effluent pump when the pump has lowered the high density fraction to a second predetermined level in the last separation chamber;

a second float assembly positioned in the last separation chamber, said second float assembly including:

c. a third float having a specific gravity lower than that of the low density fraction contained in the upper portion of the last separation chamber, said third float having associated second activation means wherein the third float activates the influent pump when the effluent pump lowers the low density fraction to a third predetermined level in the last separation chamber, and d. a fourth float having a specific gravity substantially the same as that of the third float, said fourth float having associated second deactivation means wherein the fourth float deactivates the influent pump when the low density fraction rises to a fourth predetermined level in the last separation chamber, and a third float assembly positioned in the collection chamber, said third float assembly including:

e. a fifth float, said fifth float having a specific gravity lower than that of the low density fraction contained in the collection chamber and having associated third deactivation means for deactivating the influent and effluent pumps when the low density fraction reaches a fifth predetermined level in the collection chamber.

10. The separator of claim 9 wherein the first float assembly further comprises a sixth float, said sixth float having a specific gravity substantially the same as that of the second float and having associated fourth deactivation means, wherein the sixth float functions as a backup for the second float and its associated first deactivation means and deactivates the effluent pump when the effluent pump lowers the high density fraction to a sixth predetermined level below said second predetermined level in the last separation chamber.

11. The separator of claim 9 wherein the second float assembly further comprises:

a seventh float, said seventh float having a specific gravity substantially the same as that of the third float and having associated fifth deactivation means wherein the seventh float deactivates the influent pump when the effluent pump is not operating at full capacity.

12. The separator of claim 9 wherein the third float assembly further comprises:

an eighth float, said eighth float having a specific gravity substantially the same as that of the fifth float and having associated sixth deactivation means wherein the eighth float functions as a backup for the fifth float and its associated third deactivation means and deactivates the influent and effluent pumps when the level of the low density fraction rises to a seventh predetermined level in the collection chamber, wherein the seventh predetermined level is higher than said fifth predetermined level.

13. A separator adapted for separating a mixture of fluids having different densities into a high density fraction and a low density fraction, comprising:
- a tank defining an inlet portion and a discharge portion, a first separation chamber adjacent the inlet portion, a second separation chamber coupled in fluid communication with the first separation chamber, a last separation chamber coupled in fluid communication with the second separation chamber, and a collection chamber coupled in fluid communication with the last separation chamber for receiving separated low density fraction;
- at least one first float member defined by a specific gravity less than the specific gravity of the high density fraction and suspended within the high density fraction and in a portion of the tank exclusive of the inlet portion and the first and second separation chambers;
- at least one second float member defined by a specific gravity less than the specific gravity of the low density fraction and suspended within the low density fraction and in a portion of the tank exclusive of the inlet portion and the first and second separation chambers;
- first means coupled in fluid communication with the first separation chamber and responsive to movement of the at least one second float member for controlling the introduction of the mixture of fluids into the first separation chamber; and
- second means coupled in fluid communication with the last separation chamber and responsive to movement of the at least one first float member for controlling removal of high density fraction from the last separation chamber.

14. A separator as defined in claim 13, wherein the tank includes a first partition spaced apart from the inlet portion and defining the first separation chamber, a second partition spaced apart from the first partition and defining the second separation chamber, a third partition spaced apart from the discharge portion of the tank and defining the collection chamber, and a fourth partition spaced apart from the third partition and defining the last separation chamber.

15. A separator as defined in claim 14, wherein each of said separation chambers defines an upper portion and a lower portion, and further including third means for coupling the upper portion of at least one of said separation chambers in fluid communication with the collection chamber for the transfer of separated low density fraction from the upper portion of the at least one separation chamber to the collection chamber.

16. A separator as defined in claim 15, wherein the third means includes at least one conduit coupled in fluid communication between the upper portion of each of the first, second and last separation chambers for the transfer of separated low density fraction from the upper portion of each separation chamber to the collection chamber.

17. A separator as defined in claim 16, wherein the at least one conduit is coupled in fluid communication with each of the second and last separation chambers at approximately the same level in each chamber to maintain a substantially consistent level of low density fraction throughout the second and last separation chambers.

18. A separator as defined in claim 14, wherein the second partition defines a lower portion and an upper portion, and at least one aperture extending through the lower portion for the transfer of separated high density fraction through the second partition.

19. A separator as defined in claim 18, further comprising a fifth partition spaced apart from the second partition defining a third separation chamber adjacent the second separation chamber, the third partition defining a lower portion and an upper portion and at least one aperture extending through the lower portion of the fifth partition for the transfer of separated low density fraction through the fifth partition.

20. A separator as defined in claim 14, wherein the first partition defines a lower portion and an upper portion, and further including a conduit extending through the first partition and defining a first end located adjacent the lower portion of the first partition for receiving high density fraction from the first separation chamber, and a second end located in the second separation chamber for discharging the high density fraction into the second separation chamber.

21. A separator as defined in claim 13, further comprising a first support member mounted within the last separation chamber, the at least one first float member being coupled to the first support member and movable relative to the first support member, and at least one first activation member coupled to the second means for controlling removal of high density fraction from the last separation chamber in response to contact with the first float member.

22. A separator as defined in claim 21, comprising two first float members, one first float member being coupled to the first support member above the other first float member, and two first activation members coupled to the second means, one first activation member being mounted above a respective first float member for controlling the second means to remove high density fraction from the last separation chamber in response to contact with the respective first float member, and the other first activation member being mounted below a respective first float member for controlling the second means to prevent removal of high density fraction from the last separation chamber in response to contact with the respective first float member.

23. A separator as defined in claim 13, further comprising a second support member mounted within the last separation chamber, the at least one second float member being coupled to the second support member and movable relative to the second support member, and at least one second activation member coupled to the first means for controlling the introduction of the mixture of fluids into the first separation chamber in response to contact with the second float member.

24. A separator as defined in claim 23, comprising two second float members, one second float member being coupled to the second support member above the other second float member, and two second activation members coupled to the first means, one second activation member being mounted above a respective second float member for controlling the first means to prevent the introduction of fluid into the first separation chamber in response to contact with the respective first float member, and the other second activation member being mounted below a respective second float member for controlling the first means to introduce fluid into the first separation chamber in response to contact with the respective second float member.

25. A separator as defined in claim 13, further comprising at least one third float member defined by a specific gravity less than the specific gravity of the low density fraction and suspended within the low density fraction in the collection chamber and coupled to the first means for controlling the introduction of fluid into the first separation chamber in response to movement of the third float member.

26. A separator as defined in claim 25, further comprising a third support member mounted within the collection chamber, the at least one third float member being coupled to the third support member and movable relative to the third support member, and at least one third activation member coupled to the first means and mounted on the third support member above a respective third float member and responsive to contact with the respective third float member to control the first means to prevent the introduction of fluid into the first separation chamber.

* * * * *